Dec. 17, 1957 P. H. SHERRON 2,816,330

TELEPHONE BOOTH BUILT-IN DIRECTORY HOLDER

Filed July 24, 1952

INVENTOR.
PERCIVAL H. SHERRON

BY

Busser, Smith & Harding

ATTORNEYS

United States Patent Office 2,816,330

Patented Dec. 17, 1957

2,816,330

TELEPHONE BOOTH BUILT-IN DIRECTORY HOLDER

Percival H. Sherron, Jamaica, N. Y.

Application July 24, 1952, Serial No. 300,673

3 Claims. (Cl. 20—3.5)

This invention relates to a telephone booth and, more particularly, to a telephone booth having a built-in telephone directory holder.

At the present time it is conventional practice to provide a telephone directory with each telephone booth. The directory is generally attached to a chain and hung from the booth. In the case of outdoor booths, the directory is hung inside of the booth in order to protect it from the weather. This is an unsatisfactory arrangement in that generally, in an outdoor both, only one directory can be satisfactorily hung inside of the booth in this fashion and, in either indoor or outdoor booths, the actual using of the directory suspended from the booth by a chain poses a considerable problem in manipulation for the user.

In the case of indoor booths, there is frequently provided in a convenient location adjacent to the booth a shelf or a rack upon which one or more directories are placed. The provision of a separate shelf or rack to accommodate the directories and space for the user to stand when using the books adds considerably to the space required in conjunction with the installation of a telephone booth.

It is an object of the present invention to provide a telephone booth in which there is incorporated a built-in directory holder. Such a directory holder when employed in an indoor booth reduces the space requirement associated with the installation of the telephone service and, in an outdoor booth, serves to provide for the convenient positioning of a plurality of telephone directories whereby they are readily useable and completely protected from the weather. Furthermore, the provision of the directory holder materially increases the life of the telephone directory in comparison with the life of the directory when it is merely suspended by a chain attached to the booth.

These and other objects of the invention will become apparent from the following description when read in conjunction with the accompanying drawings, in which.

Figure 1:
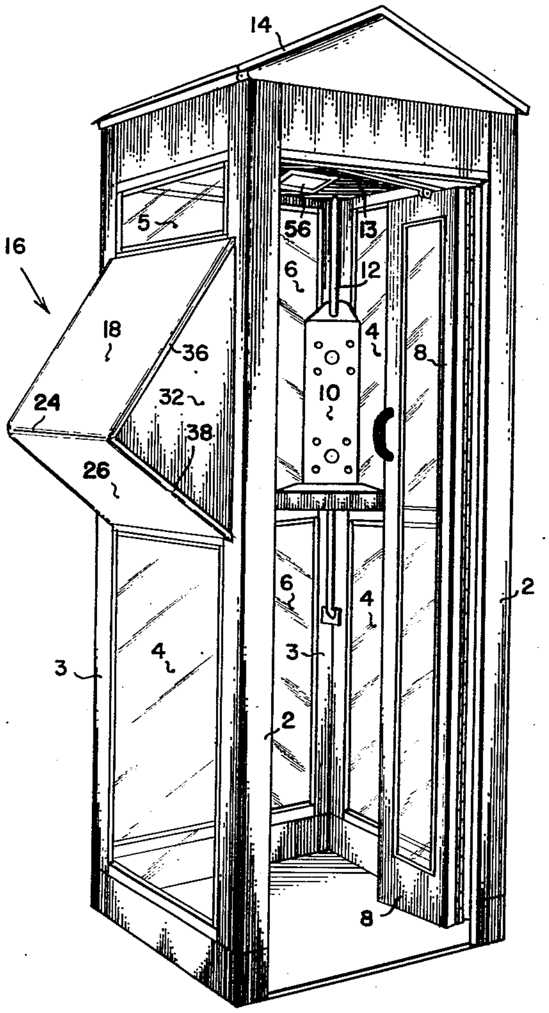
Figure 1 is a perspective showing of a telephone booth incorporating the built-in directory holder.
Figure 3:
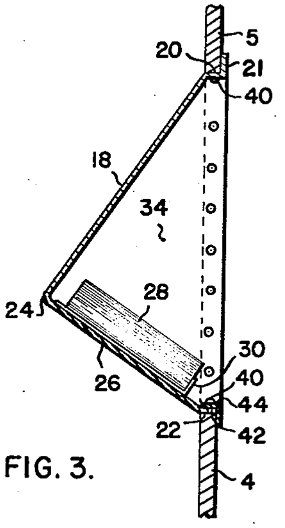
Figure 3 is a fragmentary vertical section taken on the plane 3—3 of Figure 2.
Figure 2:
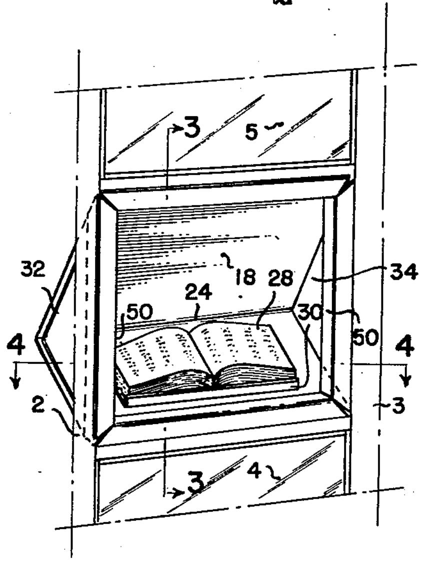
Figure 2 is a fragmentary showing of the interior of the telephone booth shown in Figure 1 showing a portion of the wall of the booth including the directory holder.
Figure 4:
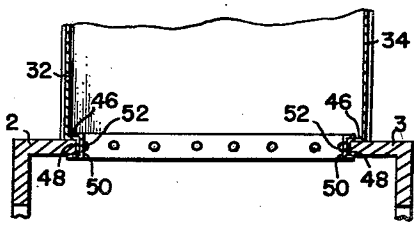
Figure 4 is a fragmentary horizontal section taken on the plane 4—4 of Figure 2.

The telephone booth shown in Figure 1 may be any conventional type of telephone booth or may preferably be a booth having a construction similar to that described in my copending patent application Sherron Case 18, Serial No. 307,630 filed Sept. 3, 1952. The booth includes front corner posts 2 and rear corner posts 3. Side panels 4 are retained between the front and rear corner posts 2 and 3, respectively, and rear panels 6 are retained between the rear corner posts 3. A door assembly 8 is hingedly mounted to one of the front corner posts 2 in a conventional manner. A telephone mounting plate 10 is provided in a rear corner of the booth and is supported by a rod 12 extending upwardly from one of the rear corner posts 2 to the ceiling structure 13 of the booth.

The booth illustrated in Figure 1 is an outdoor telephone booth provided with a sloping roof 14 and glass side panels 4 and 5 and glass rear panels 6. The built-in directory holder which will now be described can equally well be provided in an indoor type of booth having opaque sides formed from suitable sound deadening material.

The directory holder, generally indicated at 16 in Figure 1, includes a formed metal sheet 18 which is mounted in and extends outwardly from the side of the telephone booth. The sheet is provided with a bend 24 and thus provides an upwardly inclined portion 26 extending upwardly and outwardly from the side of the booth upon which a telephone directory may be supported. A sheet of material having an upturned flange 30 is attached to the inside surface of the sheet 26 and is provided to prevent a telephone directory 28 positioned thereon from sliding down the inclined sheet 26.

The directory holder structure also includes side sheets 32 and 34 which are adapted to be attached to flanges 36 extending downwardly from the sheet 18 and to flanges 38 extending upwardly from the sheet 26.

In order to provide for the installation of the directory holder, an upper side panel, such as the side panels 4 shown in Figure 1, is removed from between the corner posts 2 and 3. In place of the removed upper side panel there is inserted a small side panel 5 as shown in Figure 1. The upper end of the sheet 18 of the directory holder is formed with a horizontal portion 20 and an upwardly extending flange 21. The portion 20 is adapted to engage the lower edge of the upper side panel 5 and the flange 21 is adapted to engage the inner face of the upper side panel 5 adjacent to its lower edge. The portion 20 is secured to the lower edge of the upper side panel 5 by screws or other suitable fastening means as indicated at 40. For convenience in assembly, the lower edge of the sheet 26 is formed with a horizontally extending flange 42 which engages the upper surface 22 of the lower side panel 4 and is terminated adjacent to the upper end of the inner surface of the lower side panel 4. A cover angle 44 is secured thereover by means of screws or other suitable fastening means 40. The side sheets 32 and 34 are formed with inwardly turned flanges 46 abutting the outer surfaces of their adjacent corner posts 2 and 3 and are formed with portions 48 extending inwardly from the flanges 46 and terminating adjacent to the inner surface of their respective corner posts engaging the vertically extending edges of the posts between the side panels 4 and 5. Channel members 50 are provided to cover the exposed flanges 48 of the side sheets and are secured in conjunction with the flanges 48 of the side sheets to the vertically extending edges of the corner posts by means of screws or other suitable fastening means 52.

It will be noted that the directory holder can be conveniently constructed of such proportions that the angle of the sheet 18 is such that light being emitted from a light source 56 in the ceiling of the booth will pass downwardly into the directory holder and illuminate a telephone directory lighting therein. Thus the directory holder may be installed in a booth without requiring additional lighting means.

The telephone directory holder having the upstanding angle 30 may be adapted to retain several telephone directories and to facilitate their use by a person standing within the booth.

It should be noted that the directory holder may be installed in either the side or the rear of a booth and may be employed in either indoor or outdoor booths. The built-in directory holder is particularly desirable in the case of outdoor booths in that it provides protection for the telephone directory and simultaneously permits and facilitates use of the directory. It will be evident that in the case of an outdoor structure, suitable calking material can be inserted into the seams and flanges of the directory holder to provide a weather tight structure.

The directory holder does not intrude on or in any way limit the space in the booth and yet it is within easy reach of the user. Furthermore, a directory holder will prolong the life of directories as well as facilitate their use.

While the invention has been described in conjunction with a telephone booth having removable side panels, it will be evident that the outwardly extending recess providing the built-in directory holder may be employed in conjunction with a telephone booth of any type of structure and that these and various other modifications may be made to the details of the embodiment of the invention described herein without departing from the scope of the invention as set forth in the following claims.

What is claimed is:

1. A telephone booth including four vertical corner posts, three side panel assemblies supported between said vertical corner posts, a roof extending over said side panels and corner posts, and a telephone directory holder forming a portion of one of said side panel assemblies, said telephone directory holder comprising a structure extending outwardly externally of the booth beyond said roof and between adjacent corner posts from approximately the center of the height of said one side panel assembly to the upper portion of the height of said side panel and providing a recess of a size adapted to support a telephone directory accessible only from the interior of the telephone booth.

2. A telephone booth including four vertical corner posts, three side panel assemblies supported between said vertical corner posts, a ceiling assembly, a light source associated with said ceiling assembly, a roof extending over said side panels and corner posts and ceiling assembly, and a telephone directory holder forming a portion of one of said side panel assemblies, said telephone directory holder comprising a structure extending outwardly externally of the booth beyond said roof and between adjacent corner posts from approximately the center of the height of said one side panel assembly to the upper portion of the height of said side panel and providing a recess of a size adapted to support a telephone directory accessible only from the interior of the telephone booth, the depth of the recess, the height of the recess and the location of the ceiling light being constructed and arranged so that light from the ceiling light will illuminate substantially the entire recess.

3. A telephone booth including four vertically extending corner posts mounting flat panels forming three sides of the booth, flat side panels mounted between said corner posts, a roof extending over said corner posts and side panels, and a telephone directory holder mounted between only the upper portions of a pair of adjacent corner posts in place of at least a portion of one of said side panels, said directory holder including a lower surface extending outwardly and upwardly from the side of the booth from which it extends and adapted to support a telephone directory, an upper surface extending outwardly and downwardly from the side of the booth from which it extends and adapted to shed rain, and side surfaces extending outwardly from said adjacent corner posts and between said upper and lower surfaces enclosing the space between said upper and lower surfaces, said surfaces providing a recess opening into the interior of the telephone booth.

References Cited in the file of this patent

UNITED STATES PATENTS

| | | |
|---|---|---|
| 282,841 | Busteed | Aug. 7, 1883 |
| 1,043,055 | Carter | Oct. 29, 1912 |
| 1,810,362 | Lumley | June 16, 1931 |
| 1,857,913 | Judelson | May 10, 1932 |

FOREIGN PATENTS

| | | |
|---|---|---|
| 62,975 | Switzerland | Feb. 10, 1913 |